US010866750B2

(12) United States Patent
Chopra et al.

(10) Patent No.: US 10,866,750 B2
(45) Date of Patent: Dec. 15, 2020

(54) SYSTEM AND METHOD FOR PREDICTING DATA STORAGE CHARACTERISTICS

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 124 days.

(21) Appl. No.: 15/866,567

(22) Filed: Jan. 10, 2018

(65) Prior Publication Data
US 2019/0212934 A1 Jul. 11, 2019

(51) Int. Cl.
*G06F 12/00* (2006.01)
*G06F 3/06* (2006.01)

(52) U.S. Cl.
CPC .......... *G06F 3/0638* (2013.01); *G06F 3/0604* (2013.01); *G06F 3/067* (2013.01); *G06F 3/0683* (2013.01)

(58) Field of Classification Search
CPC ...... G06F 3/0638; G06F 3/0604; G06F 3/067; G06F 3/0683
See application file for complete search history.

(56) References Cited

U.S. PATENT DOCUMENTS

| | | | |
|---|---|---|---|
| 8,554,918 B1* | 10/2013 | Douglis | G06F 11/3485 707/640 |
| 9,098,525 B1 | 8/2015 | Mandic et al. | |
| 9,330,109 B2 | 5/2016 | Bone et al. | |
| 9,367,351 B1 | 6/2016 | Yang et al. | |
| 9,451,013 B1 | 9/2016 | Roth | |
| 9,531,809 B1 | 12/2016 | Brooker | |
| 9,740,435 B2 | 8/2017 | Dolce et al. | |
| 9,953,075 B1 | 4/2018 | Reiner et al. | |
| 9,977,704 B1 | 5/2018 | Chopra et al. | |
| 10,089,148 B1 | 10/2018 | Blitzer et al. | |
| 10,180,912 B1 | 1/2019 | Franklin et al. | |
| 2005/0033756 A1* | 2/2005 | Kottomtharayil | G06F 3/0617 |
| 2006/0224852 A1 | 10/2006 | Kottomtharayil | |
| 2009/0260021 A1 | 10/2009 | Haenel | |
| 2011/0137870 A1 | 6/2011 | Feder et al. | |
| 2011/0314069 A1 | 12/2011 | Alatorre et al. | |
| 2012/0059934 A1 | 3/2012 | Rafiq et al. | |
| 2012/0278569 A1 | 11/2012 | Kawakami et al. | |

(Continued)

FOREIGN PATENT DOCUMENTS

WO    01/06368 A1    1/2001

OTHER PUBLICATIONS

European Extended Search Report issued in corresponding EP Application No. 19150826.6, dated Apr. 5, 2019.

(Continued)

*Primary Examiner* — Gurtej Bansal
(74) *Attorney, Agent, or Firm* — Chamberlain, Hrdlicka, White, Williams & Aughtry

(57) ABSTRACT

A storage gateway for managing data includes a persistent storage and a processor. The processor obtains a data storage request for data from a client, makes a prediction of a quality of storage service for storing the data in each storage of multiple storages, selects a storage of the multiple storages based on the prediction, and stores the data in the selected storage of the multiple storages.

20 Claims, 16 Drawing Sheets

(56) References Cited

U.S. PATENT DOCUMENTS

| | | |
|---|---|---|
| 2012/0331248 A1 | 12/2012 | Kono et al. |
| 2013/0138649 A1 | 5/2013 | Broberg |
| 2013/0290627 A1 | 10/2013 | Nazari et al. |
| 2014/0082167 A1 | 3/2014 | Robinson |
| 2014/0281301 A1 | 9/2014 | Reinoso et al. |
| 2014/0297950 A1 | 10/2014 | Kuwayama |
| 2014/0380014 A1 | 12/2014 | Moyer |
| 2015/0154418 A1 | 6/2015 | Redberg |
| 2015/0205528 A1* | 7/2015 | Hyde, II ............... G06F 3/0611 711/114 |
| 2015/0261468 A1 | 9/2015 | Khoyi et al. |
| 2016/0054922 A1 | 2/2016 | Awasthi et al. |
| 2016/0062779 A1 | 3/2016 | Tsirkin |
| 2016/0062795 A1 | 3/2016 | Hu et al. |
| 2016/0085574 A1 | 3/2016 | Dornemann et al. |
| 2017/0060695 A1 | 3/2017 | Clare |
| 2017/0093976 A1 | 3/2017 | Raghunath et al. |
| 2017/0168729 A1 | 6/2017 | Faulkner et al. |
| 2017/0302555 A1 | 10/2017 | Weinman |
| 2017/0351426 A1 | 12/2017 | Anderson et al. |
| 2018/0188989 A1 | 7/2018 | Nachimuthu et al. |
| 2018/0267830 A1 | 9/2018 | Rivera et al. |
| 2018/0314429 A1 | 11/2018 | Thomas |
| 2019/0235922 A1 | 8/2019 | Iovanna et al. |
| 2019/0245794 A1 | 8/2019 | Kalman et al. |

OTHER PUBLICATIONS

European Extended Search Report issued in corresponding European Application No. 19169657.4, dated Nov. 27, 2019.

Gregory Collier et al.; "Virtualization's Next Frontier: Security"; In Proceedings of the 35th Annual ACM SIGUCCS Fall Conference (SIGUCCS '07); pp. 34-36; 2007.

* cited by examiner

SYSTEM AND METHOD FOR PREDICTING DATA STORAGE CHARACTERISTICS

BACKGROUND

Computing devices generate, use, and store data. The data may be, for example, images, documents, webpages, or meta-data associated with the data. The data may be stored on a persistent storage. Stored data may be deleted from the persistent storage.

Data from the computing device may be stored by storing it on a second computing device. The second computing device may be geographically separated from the computing device.

SUMMARY

In one aspect, a storage gateway for managing data in accordance with one or more embodiments of the invention includes a persistent storage and a processor. The processor obtains a data storage request for data from a client, makes a prediction of a quality of storage service for storing the data in each storage of multiple storages, selects a storage of the multiple storages based on the prediction, and stores the data in the selected storage of the multiple storages.

In one aspect, a method of operating a storage gateway for managing data in accordance with one or more embodiments of the invention includes obtaining a data storage request for data from a client, making a prediction of a quality of storage service for storing the data in each storage of multiple storages, selecting a storage of the multiple storages based on the prediction, and storing the data in the selected storage of the multiple storages.

In one aspect, a non-transitory computer readable medium in accordance with one or more embodiments of the invention includes computer readable program code, which when executed by a computer processor enables the computer processor to perform a method for operating a storage gateway for managing data. The method includes obtaining a data storage request for data from a client, making a prediction of a quality of storage service for storing the data in each storage of multiple storages, selecting a storage of the multiple storages based on the prediction, and storing the data in the selected storage of the multiple storages.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
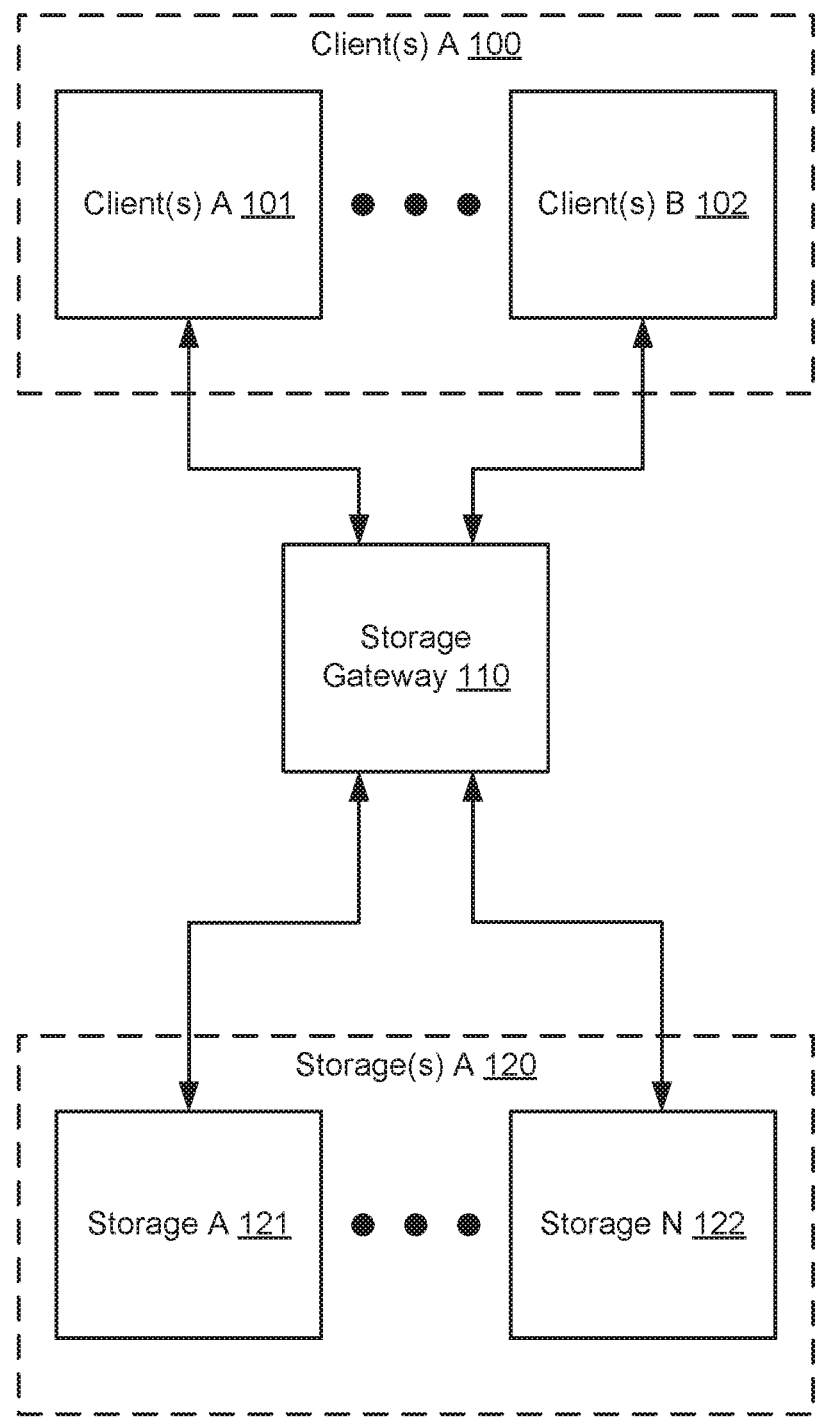
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data from clients. More specifically, the systems, devices, and methods may manage data by storing the data from the clients in storages that are remote from the clients. Storing the data remotely from the clients may reduce the likelihood that a single natural disaster, or other event, would destroy both the client storing the data and the copy of the client data stored in the storage that is remote from the clients. The system may include any number of storages that are remote from the clients and one or more copies of the data from the clients may be stored in the storages.

In one or more embodiments of the invention, the storages may be deduplicated storages. As will be discussed in greater detail below, deduplicating data uses computing resources. The amount of computing resources used to deduplicate the data is based on the data to be stored in a storage, the data already present in the storage when deduplicating the data, and other factors. One or more embodiments of the invention may reduce the computing resource cost of deduplicating data by estimating the computing resource cost of storing the data in a number of different storages and storing the data in from the clients in a storage that is selected based on the estimating. One or more embodiments of the invention may perform the estimation without sending the to-be-stored data to the storage.

As used herein, computing resources refer to processor computing cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

FIG. 1A shows an example system in accordance with one or more embodiments of the invention. The system includes client(s) (100) that store data in storages (120) via a storage gateway (110). The storage gateway (110) manages storing of the client data in the storages (120) by selecting a storage for storing the client data. The storage gateway (110) may select the storage for storing the client data based on estimated deduplication rates of storing the data in each of the storages (120). The clients (100), storage gateway (110), and storages (120) may be operably connected to each other. The aforementioned components of the system may be connected by, for example, a network, a direct connection, or any other type of connection mechanism. Each component of the system is discussed below.

In one or more embodiments of the invention, the clients (100) are programmed to store data in the storages (120) via the storage gateway (110). By storing data in the storages (120), the clients (100) may store backup copies of data and/or reduce the storage utilization rate of the clients, e.g., utilize the storages (120) as a remote storage.

In one or more embodiments of the invention, the clients (100) store a copy of all or a portion of the respective client's data in the storages (120) via the storage gateway (110). In other words, the storage gateway (110) may be used to back up the client's data.

In one or more embodiments of the invention, the clients (100) store data in the storages (120) via the storage gateway (110). In other words, rather than storing data to a local storage the clients (100) may store data in the storages (120) via the storage gateway (110) without making a local copy of the stored data.

While the clients (102, 104) are illustrated as being assigned to a single storage gateway (110), multiple groupings of clients may be assigned to any number of storage gateways without departing from the invention. Additionally, while the storage gateway (110) is illustrated as being operably connected/use all storages (120), the storage gateway (110) may only be operably connected/use a portion of the storages (120) without departing from the invention. For example, a system may include two groupings of clients, each grouping may be serviced by separate storage gateways, and each storage gateway may utilize different storages to store data. Further, in some embodiments of the invention, different storage gateways may utilizes different groupings of storages that share one or more storages between the storage groupings.

To facilitate managing data from the clients, the storage gateway (110) may store the client data in the storages (120). In one or more embodiments of the invention, the storages (120) are computing devices. The computing devices may be, for example, mobile phones, tablet computers, laptop computers, desktop computers, servers, distributed computing systems, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storages (120) may be other types of computing devices without departing from the invention.

In one or more embodiments of the invention, the storages (120) are distributed computing devices. As used herein, a distributed computing device refers to functionality provided by a logical device that utilizes the computing resources of one or more separate and/or distinct computing devices. For example, in one or more embodiments of the invention, the storages (120) may be distributed devices that include components distributed across a number of separate and/or distinct computing devices. In such a scenario, the functionality of the storages (120) may be performed by multiple different computing devices without departing from the invention.

In one or more embodiments of the invention, the storages (120) store client data and/or provide previously stored client data. The storages (120) may store or provide client data in response to requests from the storage gateway (110). In response to the requests, the storages (120) may take appropriate action to service the aforementioned storage/access requests from the storage gateway (110).

In one or more embodiments of the invention, the storages (120) store copies of previously stored client data for data security purposes. For example, copies of client data stored in a first storage may be replicated in a second storage. Additionally, different storages may have different performance characteristics and/or connection characteristics that impact the quality of storage services provided by the storages. For example, different storages may be connected to clients using different connections that have different bandwidth limitations. In another example, different storages may store different types of data and provide different degrees of deduplication of client data. Thus, different storages may provide different qualities of storage service for stored client data depending on multiple factors. For additional details regarding the storages (120), See FIG. 1C.

While each of the storages (121, 122) are illustrated as being operably connected to a single storage gateway (110), the storages storage may be operably connected to any number and/or combination of storage gateways without departing from the invention. In other words, each storage (121, 122) of the storages (120) may provide storage services for any number of storage gateways. For example, a system contemplated herein may include multiple storage gateways that each provides storage services to groups of clients. The groups may be different groups of clients (e.g., different groups each having unique members in each group) or partially different groups of clients (e.g., different groups of clients that have some clients as members of both groups).

As discussed above, the clients (100) may store/access data in the storages (120) via the storage gateway (110). In one or more embodiments of the invention, the storage gateway (110): (i) selects a location for storage of client data, (ii) stores client data in the selected location, and (iii) provides stored client data in response to client access requests. In one or more embodiments of the invention, the storage gateway (110) generates estimates of deduplication rates for multiple storages for storing client data when selecting a storage in which to store the client data. Doing so may enable a system in accordance with one or more embodiments of the invention to reduce a computing resource cost of storing client data by increasing the likelihood that the selected storage will likely provide a high deduplication rate of the data.

In one or more embodiments of the invention, the storage gateway (110) is a computing device. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 4A-5C. The storage gateway (110) may be other types of computing devices without departing from the invention.

In one or more embodiments of the invention, the storage gateway (110) is a distributed computing device. As used herein, a distributed computing device refers to functionality provided by a logical device that utilizes the computing resources of one or more separate and/or distinct computing devices. For example, in one or more embodiments of the invention, the storage gateway (110) may be a distributed device that includes components distributed across a number of separate and/or distinct computing devices. In such a scenario, the functionality of the storage gateway (110) may be performed by multiple different computing devices without departing from the invention.

In addition to the above noted functionality of the storage gateway (110), the storage gateway (110) may also act as a system controller to orchestrate operations of the system illustrated in FIG. 1A. For example, the storage gateway (110) may issue data storage/deletion/access commands to the storages. In another example, the storage gateway (110) may aggregate data of the system to facilitate generation of deduplication rate estimates. Thus, the storage gateway (110) may act as a single point of contact for the clients (100) and orchestrate the operation of the system illustrated in FIG. 1A to provide data management services to the clients (100). For additional details regarding the storage gateway (110), See FIG. 1B.

Figure 1B:
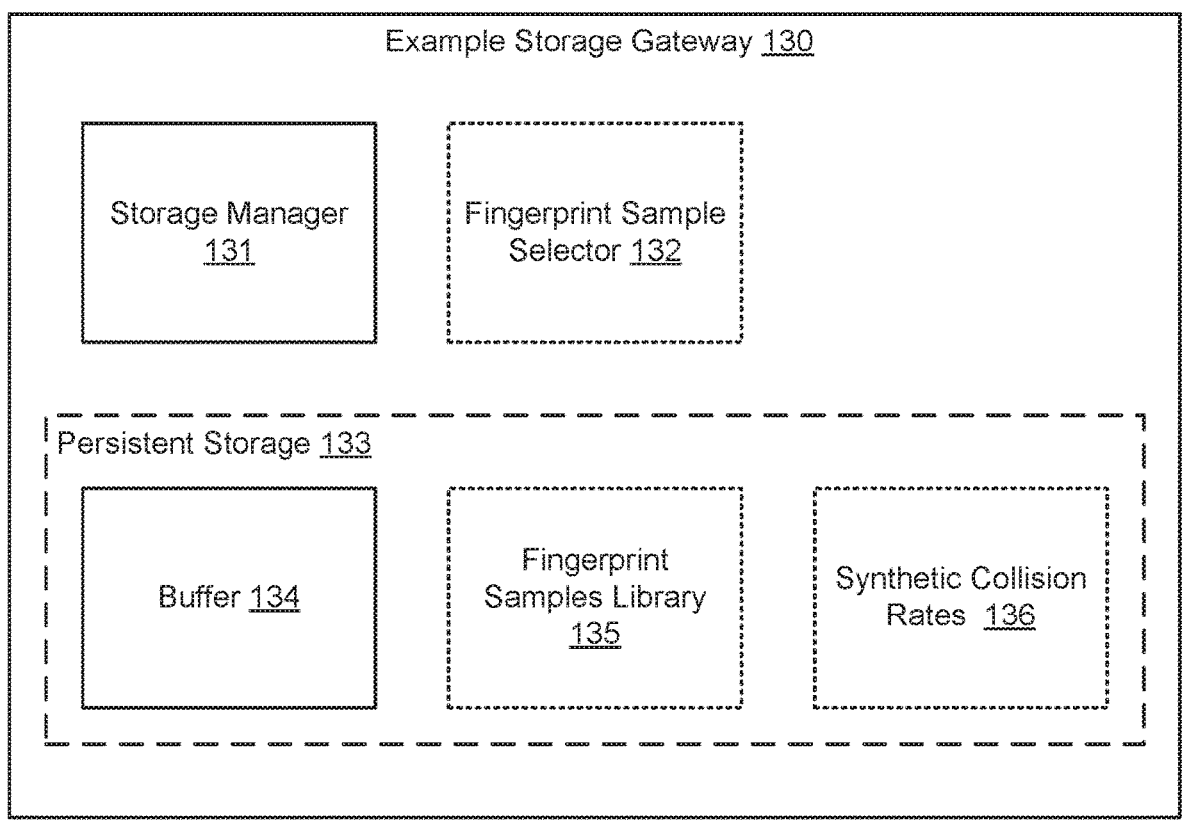
FIG. 1B shows a diagram of an example storage gateway in accordance with one or more embodiments of the invention.
Figure 1C:
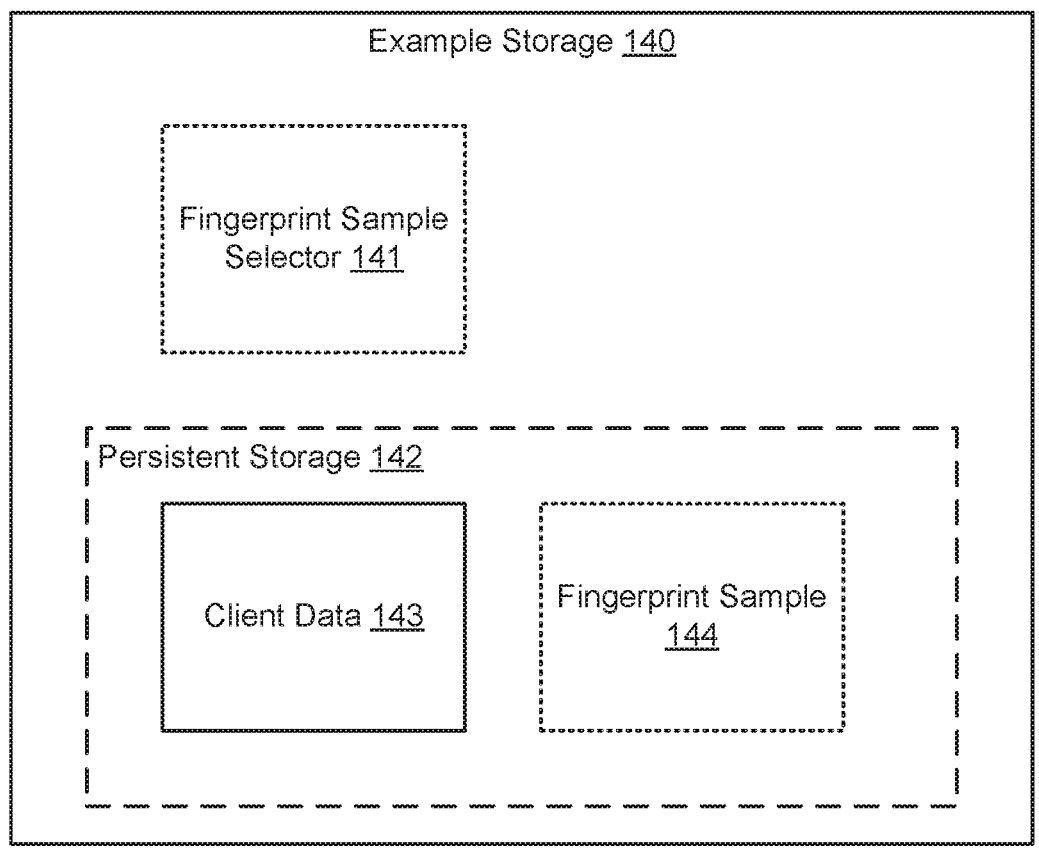
FIG. 1C shows a diagram of example storage in accordance with one or more embodiments of the invention.

To further explain embodiments of the invention, an example storage gateway (130) and an example storage (140) are illustrated in FIGS. 1B and 1C, respectively.

FIG. 1B shows a diagram of the example storage gateway (130) in accordance with one or more embodiments of the invention. To provide the functionality of the storage gateway described with respect to FIG. 1A, the example storage gateway (130) may include a storage manager (131) and a persistent storage (133). In some embodiments of the invention, the example storage gateway (130) may also include a fingerprint sample selector (132). The storage manager (131) may manage data from the clients. The persistent storage (133) may include a buffer (134) and store data structures used by the storage manager (131) to manage client data. The buffer (134) may be used to temporarily store client data in the example storage gateway (130) before storing the client data in the storages. Each component of the example storage gateway (130) is discussed below.

In one or more embodiments of the invention, to manage client data the storage manager (131): (i) stores/obtains data in/from the storages to service data storage/access requests from the clients, (ii) maintains and updates data structures in the persistent storage (133) used to select locations for storing client data, and (iii) generates estimates of deduplication rates or other characteristics of storing data in the storages using the data structures in the persistent storage (133) or, as will be discussed in greater detail below, data structures stored in other locations. To provide portions of the aforementioned functionality, the storage manager (131) may perform the methods illustrated in FIGS. 4A-5C. The storage manager (131) may manage client data using additional, fewer, or different methods without departing from the invention.

In one or more embodiments of the invention, the buffer (134) may store copies of a portion of the client data stored in the storages. The storage manager (131) may preferentially retrieve copies of client data stored in the buffer (134) when servicing client request rather than retrieving copies of the client data stored in the storages.

In one or more embodiments of the invention, the storage manager (131) is implemented as a circuit. For example, storage manager (131) may be implemented as a field programmable gate array, application integrated circuit, digital signal processor, or analog circuit. The storage manager (131) may be implemented as other types of circuit without departing from the invention.

In one or more embodiments of the invention, the storage manager (131) is implemented as computer readable instructions stored on a non-transitory computer readable storage medium being executed by a processor. The computer readable instructions may cause the processor to perform the aforementioned functions of the storage manager (131).

In one or more embodiments of the invention, the fingerprint sample selector (132): (i) obtains samples of the fingerprints of the data stored in each storage and (ii) stores the samples of the fingerprints in the fingerprint samples library (135). As used herein, a sample of fingerprints refers data structures derived from various data fragments of data. As will be discussed below, the fingerprints may be used to identify data fragments that are either similar or identical to other data fragments. The aforementioned fingerprints may be used to deduplicate data. For additional details regarding deduplication, refer to the discussion of FIG. 1C.

Figure 5A:
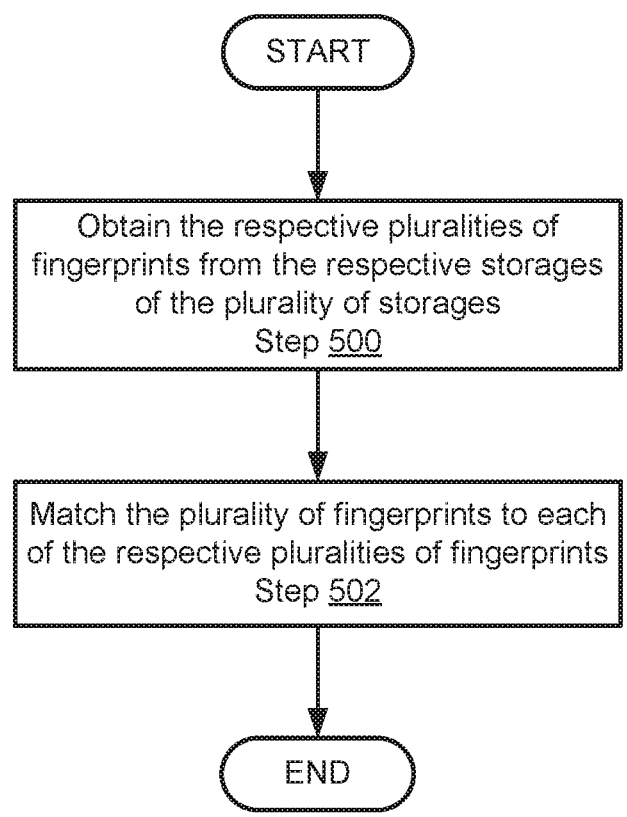
FIG. 5A shows a flowchart of a first method of obtaining collision rates in accordance with one or more embodiments of the invention.
Figure 5B:
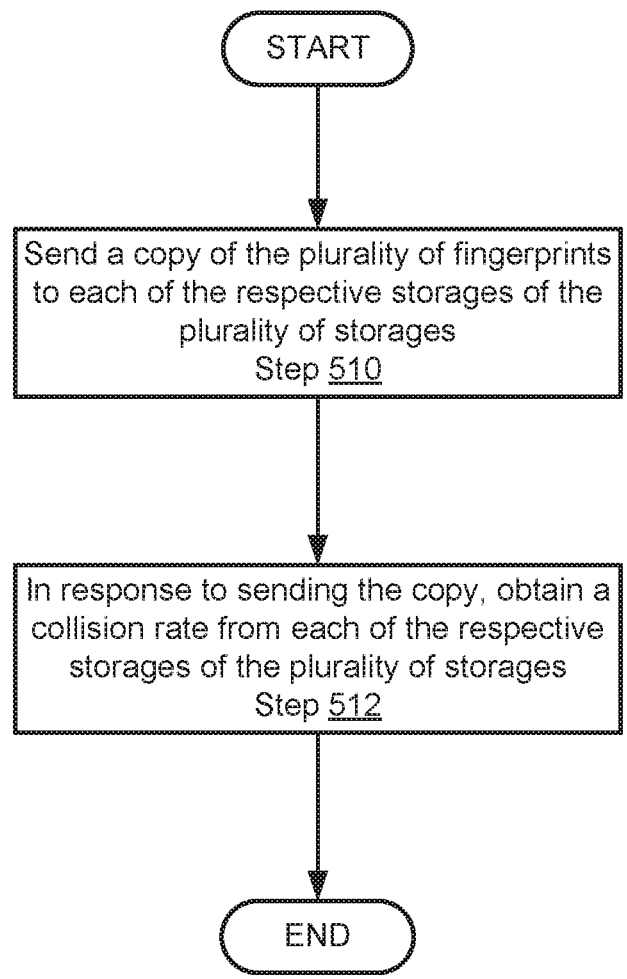
FIG. 5B shows a flowchart of a first method of obtaining collision rates in accordance with one or more embodiments of the invention.
Figure 5C:
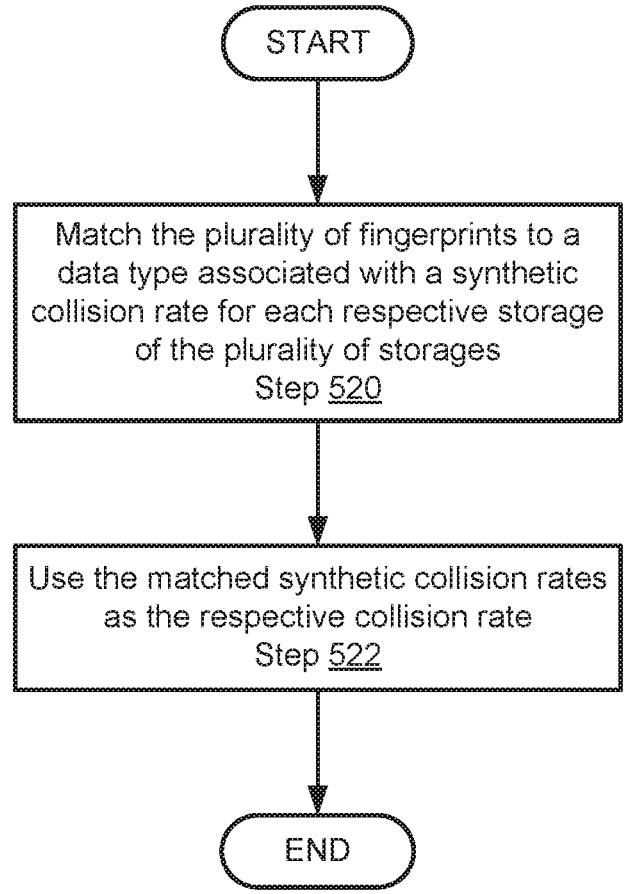
FIG. 5C shows a flowchart of a first method of obtaining collision rates in accordance with one or more embodiments of the invention.

To provide portions of the aforementioned functionality of the fingerprint sample selector (132), the fingerprint sample selector (132) may perform the methods illustrated in FIGS. 5A-5C. The fingerprint sample selector (132) may provide the aforementioned functionality using additional, fewer, or different methods without departing from the invention.

In one or more embodiments of the invention, the fingerprint sample selector (132) is implemented as a circuit. For example, the fingerprint sample selector (132) may be implemented as a field programmable gate array, application integrated circuit, digital signal processor, or analog circuit.

The fingerprint sample selector (132) may be implemented as other types of circuits without departing from the invention.

In one or more embodiments of the invention, the fingerprint sample selector (132) is implemented as computer readable instructions stored on a non-transitory computer readable storage medium being executed by a processor. The computer readable instructions may cause the processor to perform the aforementioned functions of the fingerprint sample selector (132).

While illustrated as a component of the example storage gateway (130), the fingerprint sample selector (132) may be a component of another device of the system illustrated in FIG. 1A without departing from the invention. For example, the fingerprint sample selector (132) may be a component of each storage. In such a scenario, the fingerprint sample selector (132) may send fingerprint samples to the example storage gateway (130) for storage in the fingerprint samples library (135) and thereby populate the fingerprint samples library (135).

In one or more embodiments of the invention, the persistent storage (133) is a physical device. The physical device may be, for example, a solid state hard drive, a disk drive, a tape drive, or other non-transitory storage medium. In some embodiments of the invention, the persistent storage (133) is a logical device that utilizes the physical computing resources of one or more other devices to provide data storage functionality. For example, the persistent storage (133) may be a logical storage that utilizes the physical storage capacity of disk drives of multiple, separate computing devices.

In one or more embodiments of the invention, the persistent storage (133) stores a buffer (134) and data structures used by the storage manager (131) to select a storage location for storing client data. The data structures may include a fingerprint samples library (135) and/or synthetic collision rates (136). The persistent storage (133) may store additional, different, or less data without departing from the invention. The example storage gateway (130) may utilize the aforementioned data structures when performing the methods illustrated in FIGS. 4A-5C.

In one or more embodiments of the invention, the buffer (134) is a data structure stored in the persistent storage (133). The data structure may include copies of client data stored in the storages. In some cases, client data may be first stored in the buffer (134) and copies of the client data may be subsequently stored in the storages. Portions of the client data in the buffer (134) may be deleted and thereby result in a copy of only a portion of a client's data stored in the storages being maintained in the buffer (134).

In one or more embodiments of the invention, the fingerprint samples library (135) is a data structure that stores a selection of fingerprints of data stored in each of the storages in which client data could potentially be stored. As will be discussed below with respect to FIG. 1C, fingerprints are used in the process of deduplication of client data before storing the data in a storage. The fingerprint samples library (135) may be populated by the fingerprint samples selector (132). For additional details regarding the fingerprint samples library (135), See FIGS. 2A.

In one or more embodiments of the invention, the synthetic collision rates (136) specify estimates of the collision rate between fingerprints of client data and finger prints of data already stored in the storages. The synthetic collision rates (136) may be used by the storage manager (131) to estimate a deduplication rate a storage for storing client data. The synthetic collision rates (136) may be populated by the storage manager (131). For additional details regarding the fingerprint samples library (135), See FIGS. 2C.

While illustrated as being stored in the persistent storage (133), the fingerprint samples library (135) and/or synthetic collision rates (136) may be stored in other locations without departing from the invention. For example, the aforementioned data structures may be stored on other computing devices operably connected to the example storage gateway (130). Additionally, the persistent storage (133) or another computing device may only store one of the fingerprint samples library (135) and the synthetic collision rates (136) without departing from the invention. For example, in some embodiments of the invention the storage manager (131) may only utilize one of the aforementioned data structures when selecting a location for storing client data.

As discussed above, a storage gateway may provide storage services to clients using storages. FIG. 1C shows an example storage (140) in accordance with one or more embodiments of the invention. The example storage (140) may store data, i.e., client data (143) from storage gateways or provide stored client data (143) to storage gateways in response to requests from the storage gateways.

Additionally, as discussed with respect to FIG. 1B, a fingerprint sample selector (141) may be implemented in the example storage (140). In such a scenario, the fingerprint sample selector (141) may obtain samples of fingerprints of the client data (143) and store the sample as a fingerprint sample (144). The fingerprint sample (144) may then be sent to a storage gateway or other computing device.

In one or more embodiments of the invention, the example storage (140) includes a persistent storage (142). The persistent storage (142) may be a physical device. The physical device may be, for example, a solid state hard drive, a disk drive, a tape drive, or other non-transitory storage medium. In some embodiments of the invention, the persistent storage (142) may be a logical device that utilizes the physical computing resources of one or more other devices to provide data storage functionality. For example, the persistent storage (142) may be a logical storage that utilizes the physical storage capacity of disk drives of multiple, separate computing devices.

In one or more embodiments of the invention, the persistent storage (142) stores the client data (143) and/or a fingerprint sample (144) of the fingerprints of the client data (143). The client data (143) may include data of any format and/or combination of formats. For example, the aforementioned data may include text file, audio visual file, database files, and/or unstructured data. The data may include other types of data without departing from the invention.

In one or more embodiments of the invention, the client data (143) may be deduplicated before storage in the persistent storage (142). In other words, new data from clients for storage in the example storage (140) may be deduplicated against client data (143) or other data already stored in the persistent storage (142) before being stored in the persistent storage (142).

As used herein, deduplication refers to a process that attempts to reduce the required amount of storage space used to store data by not storing multiple copies of the same files or bit patterns. Deduplication balances the input-output (IO) limits of the physical devices used to store data against the benefit of reduced storage space requirements by only comparing the to-be-stored data to a portion of all of the data stored in the location where the to-be-stored data will be stored.

To deduplicate data, the to-be-stored data may be broken down into segments, i.e., data fragments. The segments may correspond to portions of the to-be-stored data. Fingerprints that identify each segment of the to-be-stored data may be generated. The generated fingerprints may be compared to a portion of pre-existing fingerprints associated with a portion of the data already stored in the storage. Any segments of the to-be-stored data that do not match a fingerprint of the portion of the data already stored in the storage may be stored in the storage; the other segments are not stored in the storage. A file recipe (not shown) to generate the now-stored data may be generated and stored so that the now-stored data may be retrieved from the storage. The recipe may include information that enables all of the segments of the to-be-stored data that were stored in the storage and all of the segments of the data already stored in the storage having fingerprints that matched the fingerprints of the segments of the to-be-stored data to be retrieved from the storage.

As used herein, a fingerprint may be a bit sequence that virtually uniquely identifies a segment. As used herein, virtually uniquely means that the probability of collision between each fingerprint of two segments that include different data is negligible compared to the probability of other unavoidable causes of fatal errors. In one or more embodiments of the invention, the probability is $10^{-20}$ or less. In one or more embodiments of the invention, the unavoidable fatal error may be caused by a force of nature such as, for example, a tornado. In other words, the fingerprint of any two segments that specify different data will virtually always be different.

In one or more embodiments of the invention, a fingerprint of a bit sequence, i.e., a data fragment, is generated by obtaining a hash of the bit sequence. The hash may be generated using, for example, secure hashing algorithm (SHA) 1. Other hashing algorithms may be used without departing from the invention.

The process of deduplication of data, discussed above, utilizes computing resources including processing cycles, storage IO, and/or network communications bandwidth. The particular type of deduplication implemented by the storage and the type of data stored in the deduplicated storage impacts the quality of storage service provided by the example storage (140). For example, if to-be-stored data is deduplicated against very dissimilar data that is already stored, it is likely that all of the to-be-stored data will be stored. Such a scenario results in a high computing resource utilization rate for storing of the data. One or more embodiments of the invention may reduce the computing resources used to store data by improving the likelihood that a storage includes data that is similar to the to-be-stored data. In other words, the system of FIG. 1A may improve the deduplication rate of client data and thereby provide an improved storage system when storing data in a networked environment.

Figure 2A:
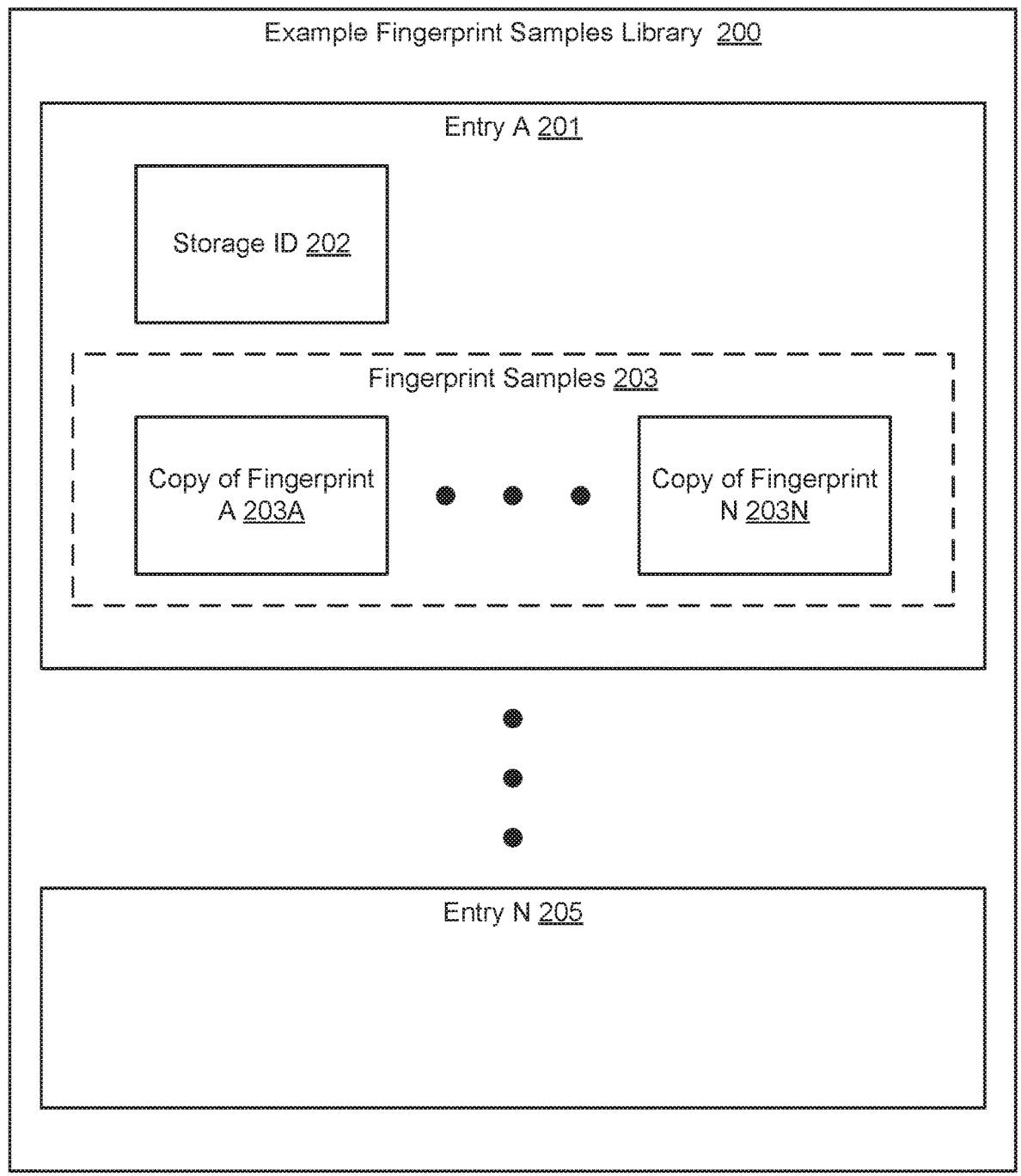
FIG. 2A shows a diagram of an example fingerprint library in accordance with one or more embodiments of the invention.
Figure 2B:
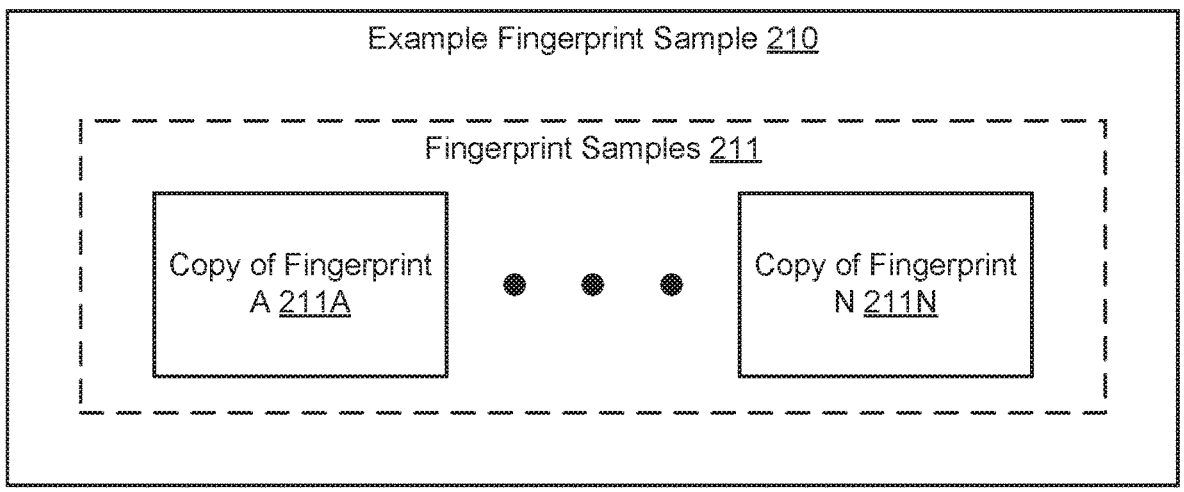
FIG. 2B shows a diagram of an example fingerprint sample in accordance with one or more embodiments of the invention.
Figure 2C:
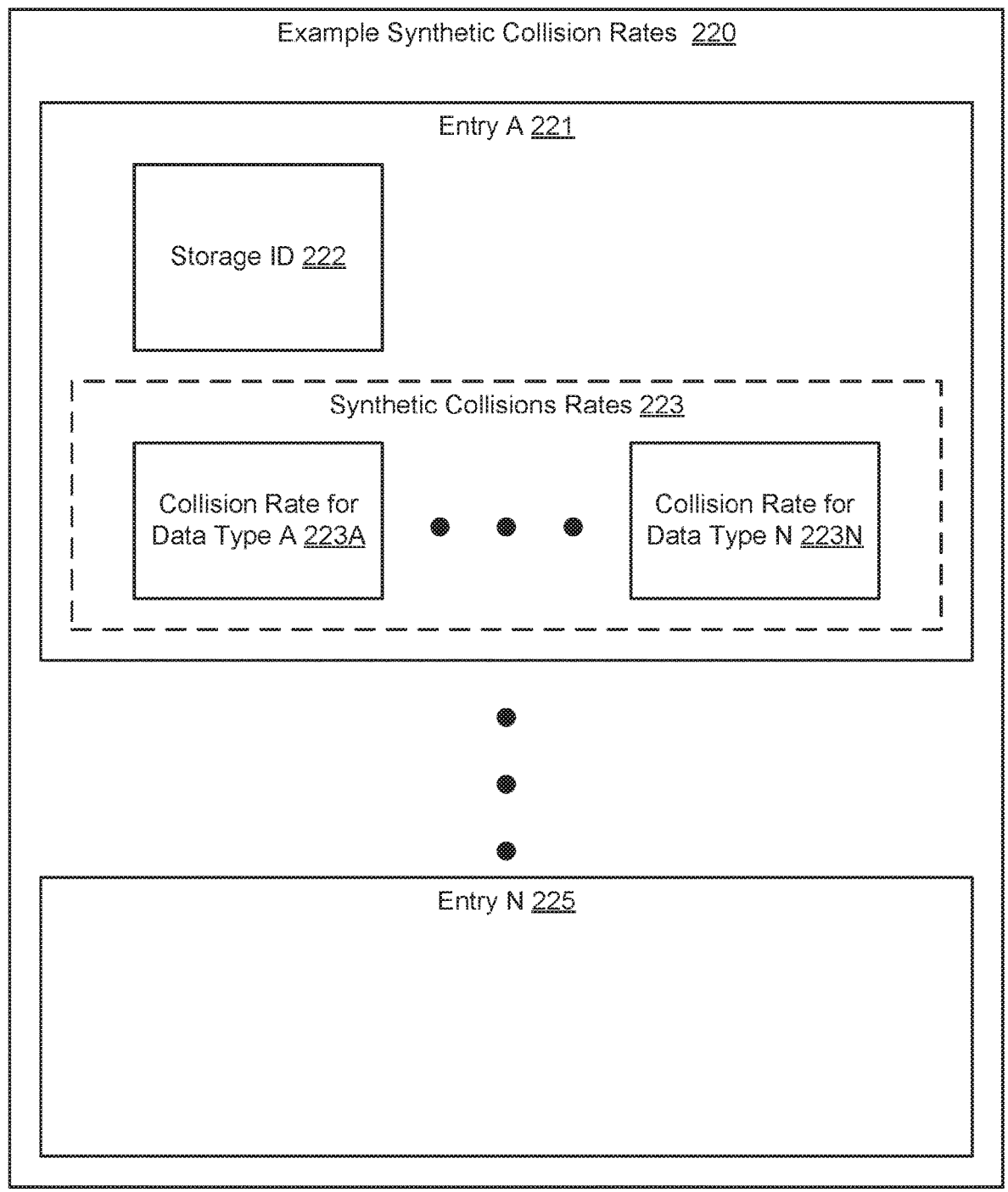
FIG. 2C shows a diagram of an example of synthetic collision rates in accordance with one or more embodiments of the invention.

When selecting a location for storing client data, the system may estimate the deduplication rate provided by various storages for the client data. The estimates may be generated using data structures stored within the system. FIGS. 2A-2C show examples of data structures that may be used by the system illustrated in FIG. 1A.

FIG. 2A shows an example fingerprint samples library (200) in accordance with one or more embodiments of the invention. The aforementioned library may be utilized by the system of FIG. 1A when determining a location, i.e., a storage, in which to store client data.

The example fingerprint samples library (200) may include entries (201, 205) associated with respective storages. Each entry (201, 205) may include a storage identifier (202) that identifies the storage to which the entry is associated.

Each entry (201, 205) may also include fingerprint samples (203) from the storage associated with the respective entry. The fingerprint samples (203) may include any number of copies of fingerprints (203A, 203N) of data stored in the storage associated with the respective entry. Each entry (201, 205) may include any number of copies of fingerprints without departing from the invention.

FIG. 2B shows an example fingerprint sample (210) in accordance with one or more embodiments of the invention. The aforementioned sample may be utilized by the system of FIG. 1A to populate the example fingerprint samples library (200). As discussed with respect to FIG. 1C, the example fingerprint sample (210) may be generated by a storage and, in turn, sent to a storage gateway or other component of the system of FIG. 1A that store the example fingerprint samples library (200).

The example fingerprint sample (210) may include fingerprint samples (211). The fingerprint samples (211) may be derived from any of the data stored in a storage. The fingerprint samples (211) may include any number of copies of fingerprints (211A, 211N). The copies of fingerprints (211A, 211N) may be obtained by making a copy of an existing fingerprint associated with data stored in a storage.

FIG. 2C shows an example of synthetic collision rates (220) in accordance with one or more embodiments of the invention. The aforementioned collision rates may be utilized by the system of FIG. 1A when determining a location, i.e., a storage, in which to store client data.

The example synthetic collision rates (220) may include entries (221, 225) associated with respective storages. Each entry (221, 225) may include a storage identifier (222) that identifies the storage to which the entry is associated.

Each entry (221, 225) may also include synthetic collision rates (223) that specify collision rates for different types of data. The synthetic collision rates (223) may include any number of collision rates for different data types (223A, 223N). For example, a first synthetic collision rate may be specified for a database type data, a second synthetic collision rate may be specified for text files, a fourth synthetic collision rate may be specified for video files, etc. Collision rates for different types of data may be specified with any level of granularity without departing from the invention. For example, synthetic collision rates may be specified for different types of data bases, different types of database transaction, etc.

While the data structures illustrated in FIGS. 2A-2C are shown as lists of entries, the data structures may be stored in other formats, may be divided into multiple data structures, and/or portion of the data structures may be distributed across multiple computing devices without departing from the invention.

Figure 3:
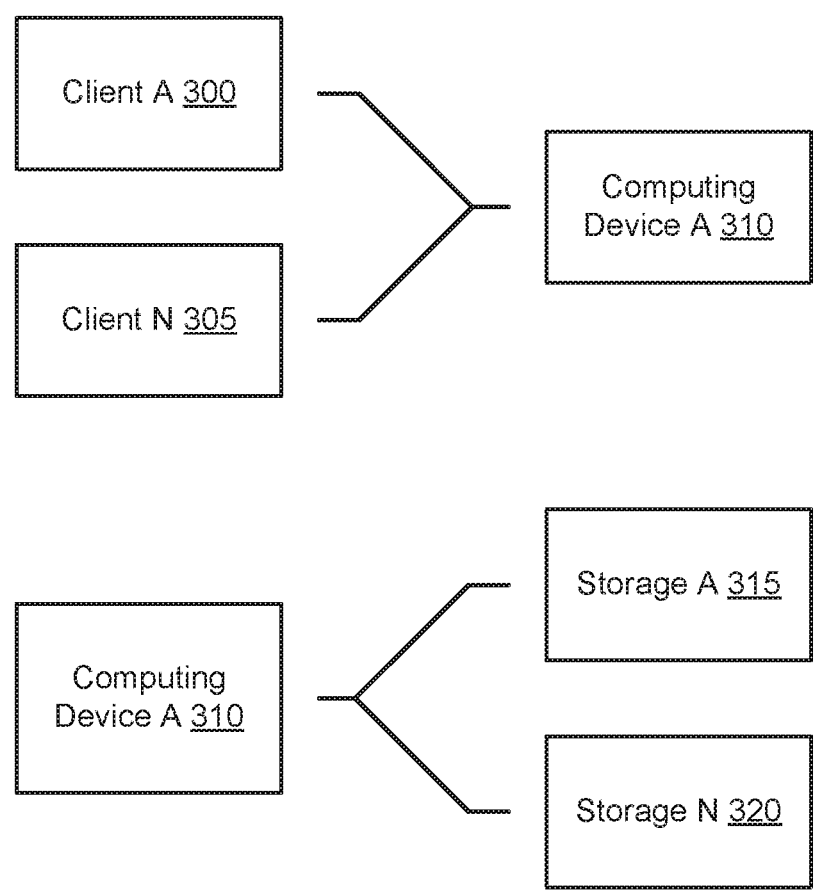
FIG. 3 shows a diagram of system relationships in accordance with one or more embodiments of the invention.

To further clarify relationships between components of the system of FIG. 1A, FIG. 3 shows a relationship diagram. As seen from the diagram, any number of clients (300, 305) may be served by a storage gateway (310), e.g., a N to one relationship. Similarly, a storage gateway (310) may utilize any number of storages (315, 320), e.g., a one to N relationship.

As discussed above, the storage gateway (110, FIG. 1A) may manage client data.

FIGS. 4A-5C show methods in accordance with one or more embodiments of the invention that may be used to manage client data.

While illustrated as separate methods, each of the methods illustrated in FIGS. 4A-5C may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

Figure 4A:
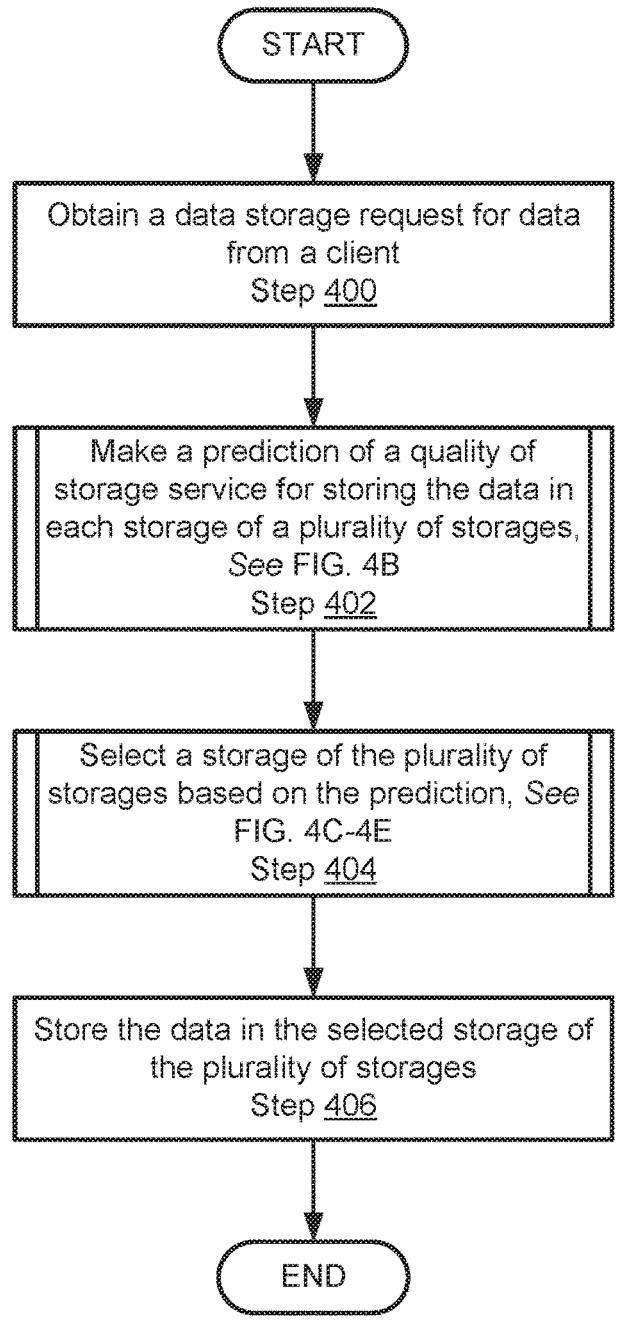
FIG. 4A shows a flowchart of a method of operating a storage gateway in accordance with one or more embodiments of the invention.

FIG. 4A shows a flowchart of a method in accordance with one or more embodiments of the invention. The method depicted in FIG. 4A may be used to manage client data in accordance with one or more embodiments of the invention. The method shown in FIG. 4A may be performed by, for example, a storage gateway (110, FIG. 1A). Other component of the system illustrated in FIG. 1A may perform the method of FIG. 4A without departing from the invention.

In Step 400, a data storage request for data is obtained from a client. As used herein, a storage request refers to a request for storing of data. The storage request may specify data from the client to be stored in a storage.

In one or more embodiments of the invention, the data storage request is obtained from a message received by a storage gateway from the client.

In Step 402, a prediction of a quality of storage service for storing the data in each storage of a plurality of storages is made. As used herein, a quality of storage service refers to the deduplication rate of client data for data against which the client data will be deduplicated.

In one or more embodiments of the invention, the predicted quality of storage service is made based on: (i) characteristics of the data from the client and (ii) data stored in each of the respective plurality of storages.

In one or more embodiments of the invention, the predicted quality of storage service for each storage is made using a sample of fingerprints of the data in each of the respective plurality of storages. A collision rate for the client data for each storage may be generated by obtaining fingerprints for a sample of the client data. A match rate of fingerprints of the sample client data to the sample of fingerprints of the data in each of the respective storages may then be determined. The predicted quality of storage service may then be based on the match rate, i.e., the higher the match rate the better the predicted quality of storage service.

In one or more embodiments of the invention, the predicted quality of storage service is made using: (i) characteristics of the data from the client and (ii) synthetic collision rates for different types of data. In one or more embodiments of the invention, the characteristics of the data specify types of the data from the client. The types of the data form the client may be matched to synthetic collision rates for the types of the data from the client. An aggregate synthetic collision rate may then be generated by forming a weighted average of the synthetic collision rate for each match and the relative proportion of the matches. The aggregate synthetic collision rate may be used as the predicted quality of storage service.

Figure 4B:
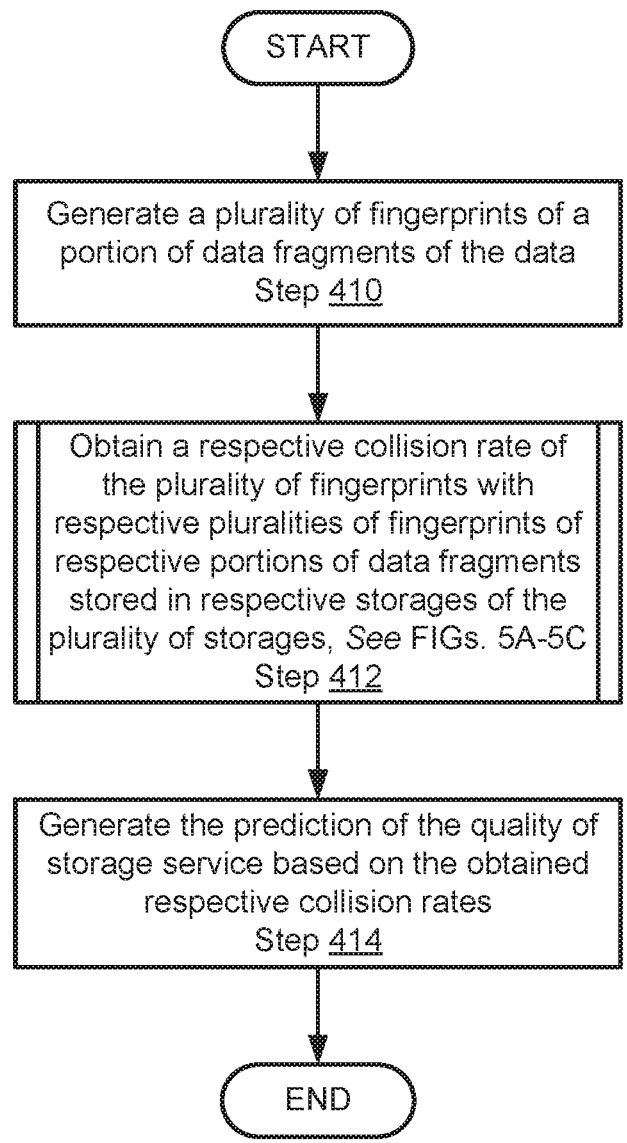
FIG. 4B shows a flowchart of a method of making predictions of quality of storage service in accordance with one or more embodiments of the invention.

In one or more embodiments of the invention, the predicted quality of storage service is made via the method illustrated in FIG. 4B. The prediction may be made using other methods without departing from the invention.

In Step 404, a storage of the plurality of storages is selected based on the predicted quality of storage service made in Step 402.

In one or more embodiments of the invention, the storage is selected by ranking the predictions of Step 402 from a highest deduplication rate to a lowest deduplication rate and the storage proving the highest deduplication rate is used as the selected storage.

Figure 4C:
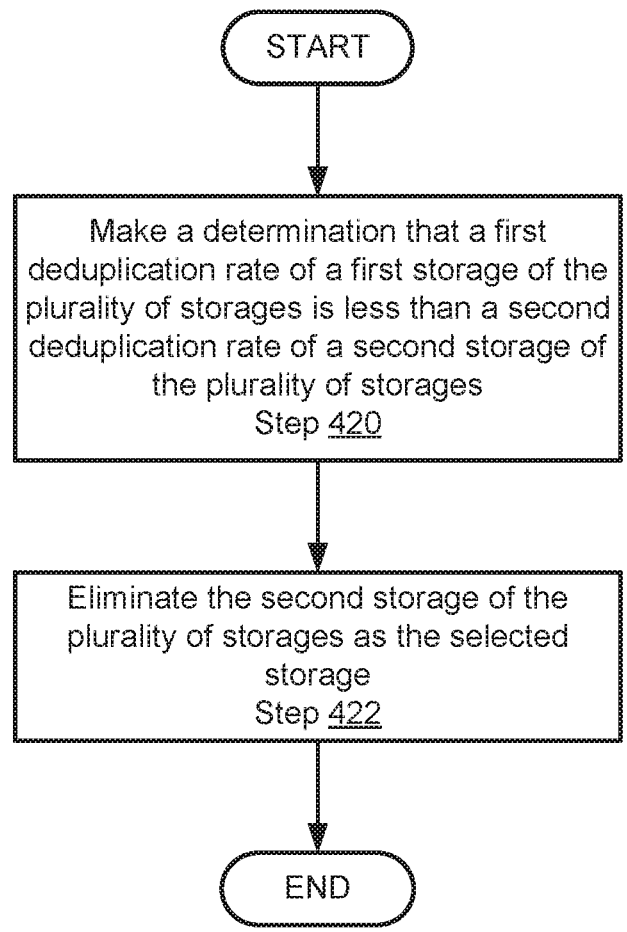
FIG. 4C shows a flowchart of a first method of selecting a storage for storing client data in accordance with one or more embodiments of the invention.

In one or more embodiments of the invention, the storage of the plurality of storages is selected via the method illustrated in FIG. 4C. In one or more embodiments of the invention, the storage of the plurality of storages is selected via the method illustrated in FIG. 4D. In one or more embodiments of the invention, the storage of the plurality of storages is selected via the method illustrated in FIG. 4E. The storage may be selected using other methods without departing from the invention.

In Step 406, the data from the client is stored in the selected storage of the plurality of storages.

In one or more embodiments of the invention, the data from the client is stored by sending all or a portion of the data from the client to the selected storage.

The method may end following Step 408.

FIG. 4B shows a flowchart of a method in accordance with one or more embodiments of the invention. The method depicted in FIG. 4B may be used to predict a quality of storage service in accordance with one or more embodiments of the invention. The method shown in FIG. 4B may be performed by, for example, a storage gateway (110, FIG. 1A). Other component of the system illustrated in FIG. 1A may perform the method of FIG. 4B without departing from the invention.

In Step 410, a plurality of fingerprints of a portion of data fragments of the data obtained from the client is generated.

In one or more embodiments of the invention, the portion of data fragments represents a sample of the data from the client.

In one or more embodiments of the invention, the fingerprints are generated as described with respect to FIG. 1C.

In Step 412, a respective collision rate of the generated plurality of fingerprints with respective pluralities of fingerprints of respective portions of data fragments stored in each storage of the plurality of storages is obtained.

In one or more embodiments of the invention, the respective collision rates for each storage is obtained via the method illustrated in FIG. 5A. In one or more embodiments of the invention, the respective collision rates for each storage is obtained via the method illustrated in FIG. 5B. In one or more embodiments of the invention, the respective collision rates for each storage is obtained via the method illustrated in FIG. 5C. The respective collision rates for each storage may be obtained via other methods without departing from the invention.

In Step 414, the prediction of the quality of storage service for each storage is generated based on the obtained respective collision rates of the storages.

In one or more embodiments of the invention, the predicted quality of storage service may be generated by ranking the respective collision rates of the storages from highest to lowest. The ranking may be used as the quality of storage service for each storage. In other words, higher collision rates indicate higher quality of storage service.

The method may end following Step 414.

FIG. 4C shows a flowchart of a method in accordance with one or more embodiments of the invention. The method depicted in FIG. 4C may be used to select a storage to store client data in accordance with one or more embodiments of the invention. The method shown in FIG. 4C may be performed by, for example, a storage gateway (110, FIG. 1A). Other component of the system illustrated in FIG. 1A may perform the method of FIG. 4C without departing from the invention.

In Step 420, a determination that a first deduplication rate of a first storage of the plurality of storages is less than a second deduplication rate of a second storage of the plurality of storages is made.

In Step 422, the second storage of the plurality of storages is eliminated from being the selected storage in response to the determination.

The method may end following Step 422.

In one or more embodiments of the invention, the method illustrated in FIG. 4C is repeated until only a single storage of the plurality of storages remains. The remaining storage is used as the selected storage.

Figure 4D:
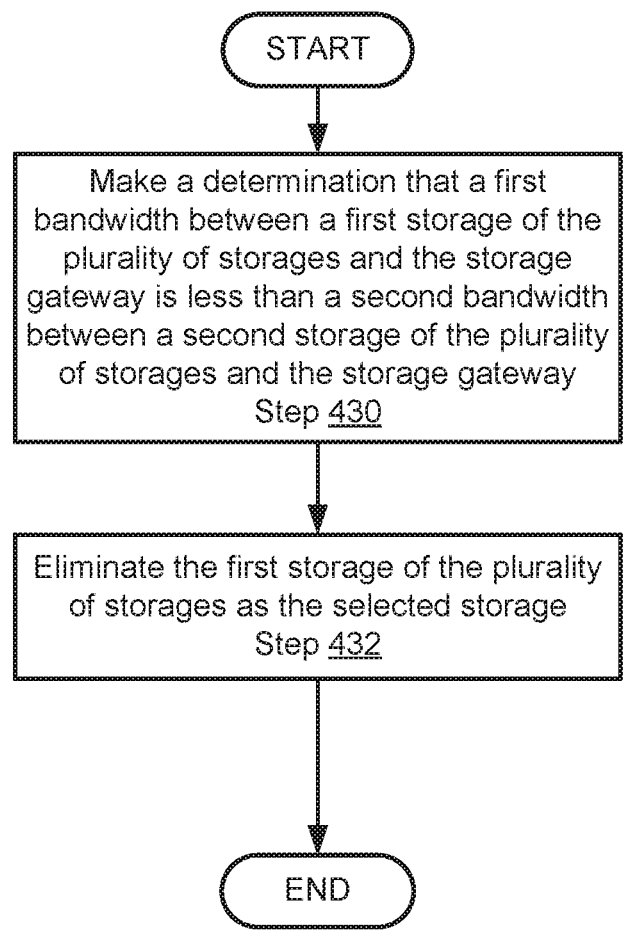
FIG. 4D shows a flowchart of a second method of selecting a storage for storing client data in accordance with one or more embodiments of the invention.

FIG. 4D shows a flowchart of a method in accordance with one or more embodiments of the invention. The method depicted in FIG. 4D may be used to select a storage to store client data in accordance with one or more embodiments of the invention. The method shown in FIG. 4D may be performed by, for example, a storage gateway (110, FIG. 1A). Other component of the system illustrated in FIG. 1A may perform the method of FIG. 4D without departing from the invention.

In Step 430, a determination that a first bandwidth between a first storage of the plurality of storages and the storage gateway is less than a second bandwidth between a second storage of the plurality of storages and the storage gateway is made.

In Step 432, the first storage of the plurality of storages is eliminated from being the selected storage in response to the determination.

The method may end following Step 432.

In one or more embodiments of the invention, the method illustrated in FIG. 4D is repeated until only a single storage of the plurality of storages remains. The remaining storage is used as the selected storage.

Figure 4E:
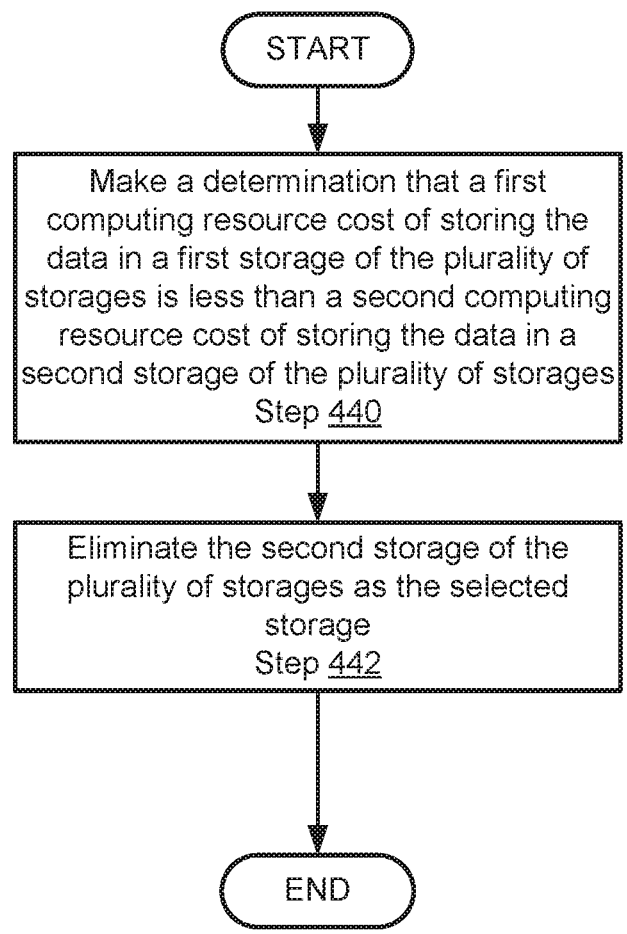
FIG. 4E shows a flowchart of a third method of selecting a storage for storing client data in accordance with one or more embodiments of the invention.

FIG. 4E shows a flowchart of a method in accordance with one or more embodiments of the invention. The method depicted in FIG. 4E may be used to select a storage to store client data in accordance with one or more embodiments of the invention. The method shown in FIG. 4E may be performed by, for example, a storage gateway (110, FIG. 1A). Other component of the system illustrated in FIG. 1A may perform the method of FIG. 4E without departing from the invention.

In Step 440, a determination that a first computing resource cost of storing the data in a first storage of the plurality of storages is less than a second computing resource cost of storing the data in a second storage of the plurality of storages is made.

In Step 442, the second storage of the plurality of storages is eliminated from being the selected storage in response to the determination.

The method may end following Step 442.

In one or more embodiments of the invention, the method illustrated in FIG. 4E is repeated until only a single storage of the plurality of storages remains. The remaining storage is used as the selected storage.

In one or more embodiments of the invention, the methods illustrated in FIGS. 4C-4E may each be performed and a storage may be selected based on the storages selected in each of the methods. For example, the storage that is selected the largest number of times via the methods illustrated in FIGS. 4C-4E may be used as the selected storage. In other scenarios, a weighting of the selections of each of the methods illustrated in FIGS. 4C-4E may be used to determine an overall selection. For example, the method illustrated in FIG. 4C may be given high weight and the methods illustrated in FIGS. 4D and 4E may be given moderate weight. Thus, unless the methods illustrated in FIGS. 4D and 4E both result in the selection of the same storage, the storage selected via the method illustrated in FIG. 4C may be used as the selected storage.

FIG. 5A shows a flowchart of a method in accordance with one or more embodiments of the invention. The method depicted in FIG. 5A may be used to obtain collision rates for client data in accordance with one or more embodiments of the invention. The method shown in FIG. 5A may be performed by, for example, a storage gateway (110, FIG. 1A). Other component of the system illustrated in FIG. 1A may perform the method of FIG. 5A without departing from the invention.

In Step 500, the respective pluralities of fingerprints from the respective storages of the plurality of storages are obtained. As used herein, a storage request refers to a request for storing of data.

In Step 502, the plurality of fingerprints of the portion of the client data is matched to each of the obtained respective pluralities of fingerprints. A match rate for each storage may then be determined from the matching. The match rate may be used as the obtained collision rate for each storage.

The method may end following Step 502.

FIG. 5B shows a flowchart of a method in accordance with one or more embodiments of the invention. The method depicted in FIG. 5B may be used to obtain collision rates for client data in accordance with one or more embodiments of the invention. The method shown in FIG. 5B may be performed by, for example, a storage gateway (110, FIG. 1A). Other component of the system illustrated in FIG. 1A may perform the method of FIG. 5B without departing from the invention.

In Step 510, a copy of the plurality of fingerprints of the client data is sent to each of the respective storages of the plurality of storages.

In Step 512, a collision rate for each storage of the plurality of storages is obtained from each respective storage in response to sending the copy of the plurality of fingerprints of the client data.

In one or more embodiments of the invention, the collision rate for each storage is obtained from respective messages sent from each storage to the storage gateway.

The method may end following Step 512.

Thus, as illustrated in FIG. 5B, in some embodiments of the invention, a collision rate may be generated by a storage and, in turn, sent to the storage gateway.

FIG. 5C shows a flowchart of a method in accordance with one or more embodiments of the invention. The method depicted in FIG. 5C may be used to obtain collision rates for client data in accordance with one or more embodiments of the invention. The method shown in FIG. 5C may be performed by, for example, a storage gateway (110, FIG. 1A). Other component of the system illustrated in FIG. 1A may perform the method of FIG. 5C without departing from the invention.

In Step 520, the plurality of fingerprints are matched to a synthetic collision rate for each respective storage of the plurality of storages.

In one or more embodiments of the invention, the plurality of fingerprints are matched by determining one or more data types of the data fragments associated with the plurality of fingerprints. In other words, file types of the data fragments associated with the fingerprints are determined. The determined data types are then matched to synthetic collision rates associated with each of the data types.

In Step 522, the matched synthetic collision rates are used as the respective collision rates for each of the storages.

The method may end following Step 522.

Figure 6:
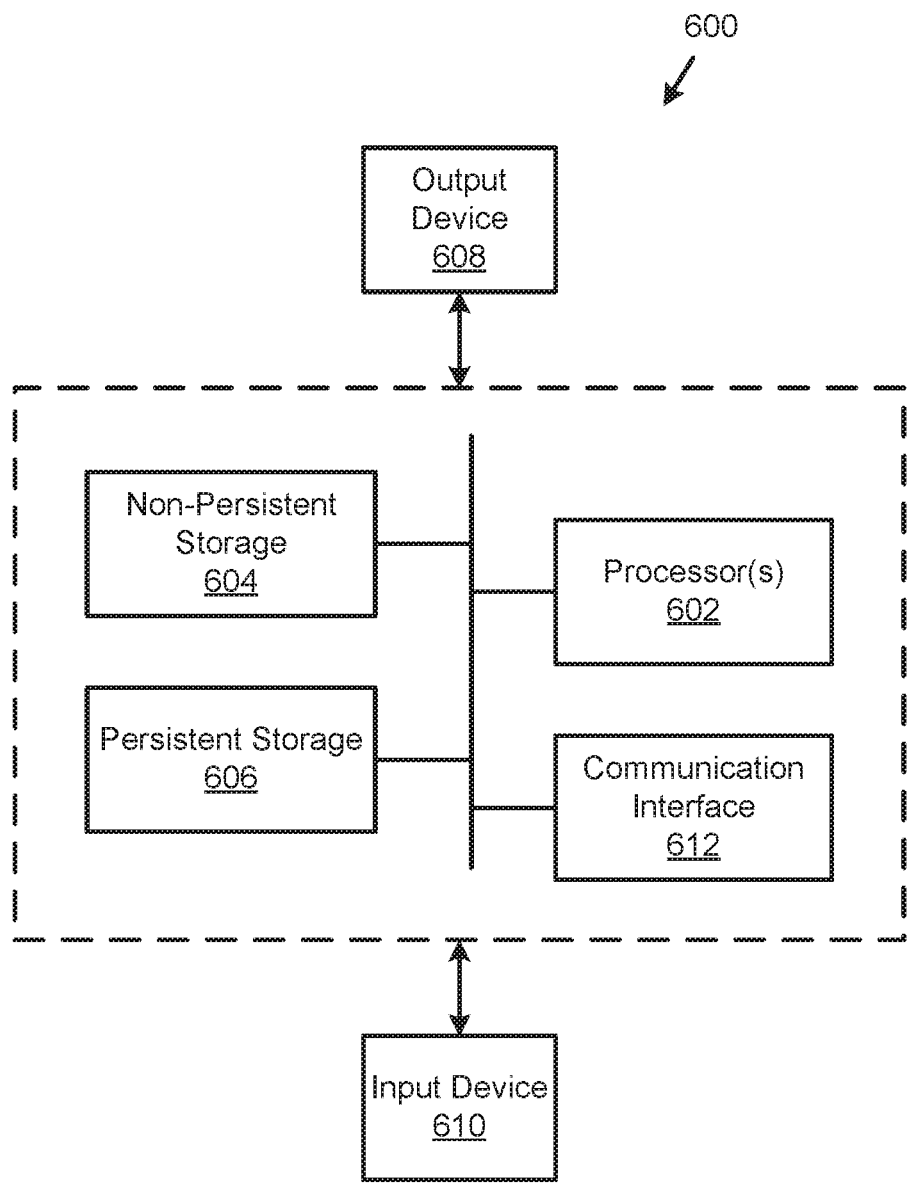
FIG. 6 shows a diagram of a computing device in accordance with one or more embodiments of the invention.

As discussed above, embodiments of the invention may be implemented using a computing device. The system of FIG. 1A may utilize any number of computing devices to provide the functionality described throughout this application. For example, a storage gateway, storage, or other elements of the system of FIG. 1A may be implemented using computing devices. FIG. 6 shows a diagram of a computing device in accordance with one or more embodiments of the invention. The computing device (600) may include one or more computer processor(s) (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may address the problem of managing data in a networked environment that includes a number of storages for storing deduplicated data. Due to the process of deduplication, storing data in any of the storages may have widely different impacts on the system depending on the data stored in each of the storages. For example, storing a database in a storage that predominantly stores video files would likely result in a low deduplication rate of the data because it is unlikely that any data fragments of the database would a duplicate of data fragments of the video files. Embodiments of the invention reduce the computing resources used to store data in a network environment by increasing the likelihood of having a high deduplication rate for the storage of data. Systems in accordance with embodiments of the invention may provide this functionality by predicting the deduplication rate for storing client data in a storage without sending the client data to the storage. By making the prediction without sending the client data to the storage, network bandwidth, processor cycles, and disk input-output cycles are saved thereby improving the storage performance of the system. In contrast, sending client data for storage only to later determine that the storage provides a poor deduplication rate consumes large amounts of network bandwidth, processor cycles, and disk input-output cycles to transfer the stored client data to another storage.

The aforementioned problem of managing data in a networked environment is uniquely encountered due to the technological environment in which networked storage operates. Due to the rise of geographically distributed storages, client data is frequently stored in storages that vary in location and quality of storage service provided by the storages varies. Embodiments of the invention may proactively identify an appropriate storage at the time of storing data to increase the likelihood that the selected storage will provide a high deduplication rate of the client data. Thus, embodiments of the invention improve the operation of the storage of data in a networked environment by reducing the computing resource cost of storing data by improving deduplication rates.

Additionally, embodiments of the invention may further improve a quality of storage service provided to clients by increasing a buffer hit rate. As discussed with respect to FIG. 1B, a buffer on a cloud storage may be used to provide data rather than a storage so long as the buffer includes the data. Embodiments of the invention may result in the aggregation of clients that store similar data to utilize the same storage gateway and thereby result in the increased likelihood of the buffer including data utilized by each of the aggregated clients. Providing data using a buffer, rather than a storage, may consume fewer computing resources and thereby improve the efficiency of the system.

The issues discussed above should be understood as being examples of issues addressed by embodiments of the invention disclosed herein and the invention should not be limited to addressing the same/similar issues. The disclosed invention is broadly applicable to address a range of problems beyond those discussed herein.

One or more embodiments of the invention may be implemented using instructions executed by one or more processors of the data management device.

Further, such instructions may correspond to computer readable instructions that are stored on one or more non-transitory computer readable mediums.

One or more embodiments of the invention may enable one or more of the following: i) improve a quality of storage service provided to clients by improving a deduplication rate of stored client data, ii) reduce the cost of storing data in a network environment by reducing the computing resource consumption for storing the data, and iii) increase the storage capacity of the network by improving the deduplication rate of stored data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage gateway for managing data, comprising:
a persistent storage; and
a processor programmed to:
obtain a data storage request for data from a client;
perform a comparison, wherein the comparison is based, at least in part, on comparing characteristics of the data and a plurality of synthetic collision rates associated with a storage of a plurality of storages, wherein each of the plurality of synthetic collision rates corresponds to a different data type;

generate an aggregate synthetic collision rate based on the comparison, the aggregate synthetic collision rate comprising a weighted average of the comparison of the data with each of the plurality of synthetic collision rates;

make a prediction of a quality of storage service for storing the data in each storage of the plurality of storages based on the aggregate synthetic collision rate;

select the storage of the plurality of storages based on the prediction; and store the data in the selected storage of the plurality of storages.

2. The storage gateway of claim 1, wherein the prediction of the quality of storage service specifies, in part, a bandwidth cost of storing the data in each respective storage of the plurality of storages.

3. The storage gateway of claim 1, wherein the prediction of the quality of storage service specifies, in part, a computation resource cost of storing the data in each respective storage of the plurality of storages.

4. The storage gateway of claim 1, wherein the prediction of the quality of storage service specifies, in part, a computation resource cost of obtaining the data when the data is stored in each respective storage of the plurality of storages.

5. The storage gateway of claim 1, wherein selecting the storage of the plurality of storages based on the prediction comprises:

making a determination that a first deduplication rate of a first storage of the plurality of storages is less than a second deduplication rate of a second storage of the plurality of storages; and eliminating the second storage of the plurality of storages as the selected storage.

6. The storage gateway of claim 1, wherein selecting a storage of the plurality of storages based on the prediction comprises:

making a determination that a first bandwidth between a first storage of the plurality of storages and the storage gateway is less than a second bandwidth between a second storage of the plurality of storages and the storage gateway; and eliminating the first storage of the plurality of storages as the selected storage.

7. The storage gateway of claim 1, wherein selecting a storage of the plurality of storages based on the prediction comprises:

making a determination that a first computation cost of storing the data in a first storage of the plurality of storages is less than a second computation cost of storing the data in a second storage of the plurality of storages; and eliminating the second storage of the plurality of storages as the selected storage.

8. The storage gateway of claim 1, wherein a synthetic collision rate of the plurality of synthetic collision rates is based on a data type, wherein the data type is not based on the data.

9. The storage gateway of claim 8, wherein the prediction is further based, at least in part, on a second synthetic collision rate of the plurality of synthetic collision rates associated with the storage of the plurality of storages.

10. The storage gateway of claim 9, wherein the second synthetic collision rate is based on a second data type, wherein the second data type is not based on the data.

11. The storage gateway of claim 10, wherein the processor is further programed to generate the aggregate synthetic collision rate by:

matching a portion of the data to the data type;

matching a second portion of the data to the second data type;

generating a weighted average of the synthetic collision rate and the second synthetic collision rate based on:

a match value of the portion of the data to the data type, and a second match value of the second portion of the data to the data type; and using the weighted average as the predicted quality of storage service.

12. The storage gateway of claim 1, wherein making the prediction of the quality of storage service for storing the data in each storage of the plurality of storages comprises:

generating a plurality of fingerprints of a portion of data fragments of the data;

obtaining a respective collision rate of the plurality of fingerprints with respective pluralities of fingerprints of respective portions of data fragments stored in respective storages of the plurality of storages; and generating the prediction based, in part, on the obtained respective collision rate.

13. The storage gateway of claim 12, wherein the respective collision rate is on a per storage of the plurality of storages basis.

14. The storage gateway of claim 12, wherein obtaining the respective collision rate of the plurality of fingerprints with respective pluralities of fingerprints of respective portions of data fragments stored in respective storages of the plurality of storages comprises:

obtaining the respective pluralities of fingerprints from the respective storages of the plurality of storages; and matching the plurality of fingerprints to each of the respective pluralities of fingerprints to determine the respective collision rate.

15. The storage gateway of claim 12, wherein obtaining the respective collision rate of the plurality of fingerprints with respective pluralities of fingerprints of respective portions of data fragments stored in respective storages of the plurality of storages comprises:

sending a copy of the plurality of fingerprints to each of the respective storages of the plurality of storages; and in response to sending the copy, receiving a collision rate from each of the respective storages of the plurality of storages.

16. The storage gateway of claim 12, wherein obtaining the respective collision rate of the plurality of fingerprints with respective pluralities of fingerprints of respective portions of data fragments stored in respective storages of the plurality of storages comprises:

obtaining the respective pluralities of fingerprints from the persistent storage, wherein the processor is further programmed to:

store a copy of the respective pluralities of fingerprints in the persistent storage when storing the respective pluralities of fingerprints in the respective storages of the plurality of storages, wherein the respective pluralities of fingerprints are stored in the respective storages of the plurality of storages in response to requests from clients.

17. A method of operating a storage gateway for managing data, comprising:
- obtaining a data storage request for data from a client;
- performing a comparison, wherein the comparison is based, at least in part, on comparing characteristics of the data and a plurality of synthetic collision rates associated with a storage of a plurality of storages, wherein each of the plurality of synthetic collision rates corresponds to a different data type;
- generating an aggregate synthetic collision rate based on the comparison, the aggregate synthetic collision rate comprising a weighted average of the comparison of the data with each of the plurality of synthetic collision rates;
- making a prediction of a quality of storage service for storing the data in each storage of the plurality of storages based on the aggregate synthetic collision rate;
- selecting a storage of the plurality of storages based on the prediction; and
- storing the data in the selected storage of the plurality of storages.

18. The method of claim 17, wherein a synthetic collision rate of the plurality of synthetic collision rates is based on a data type, wherein the data type is not based on the data.

19. A non-transitory computer readable medium comprising computer readable program code, which when executed by a computer processor enables the computer processor to perform a method for operating a storage gateway for managing data, the method comprising:
- obtaining a data storage request for data from a client;
- performing a comparison, wherein the comparison is based, at least in part, on a comparing characteristics of the data and a plurality of synthetic collision rates associated with a storage of a plurality of storages, wherein each of the plurality of synthetic collision rates corresponds to a different data type;
- generating an aggregate synthetic collision rate based on the comparison, the aggregate synthetic collision rate comprising a weighted average of the comparison of the data with each of the plurality of synthetic collision rates;
- making a prediction of a quality of storage service for storing the data in each storage of the plurality of storages based on the aggregate synthetic collision rate;
- selecting a storage of the plurality of storages based on the prediction; and
- storing the data in the selected storage of the plurality of storages.

20. The non-transitory computer readable medium of claim 19, wherein a synthetic collision rate of the plurality of synthetic collision rates is based on a data type, wherein the data type is not based on the data.

* * * * *